United States Patent
Bettadahalli et al.

(10) Patent No.: US 7,200,678 B1
(45) Date of Patent: Apr. 3, 2007

(54) SELECTING NETWORK ADDRESS OFFERED BY A PLURALITY OF SERVERS BASED ON SERVER IDENTIFICATION INFORMATION

(75) Inventors: Sundar Bettadahalli, Sunnyvale, CA (US); Pankaj Malhotra, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 856 days.

(21) Appl. No.: 10/235,114

(22) Filed: Sep. 4, 2002

(51) Int. Cl.
*G06F 15/16* (2006.01)
*H04L 12/28* (2006.01)

(52) U.S. Cl. .................. 709/245; 370/401; 709/203
(58) Field of Classification Search ............ None
See application file for complete search history.

(56) References Cited

U.S. PATENT DOCUMENTS 6,205,477 B1 * 3/2001 Johnson et al. ............ 709/220
6,304,913 B1 * 10/2001 Rune ....................... 709/241
6,452,925 B1 * 9/2002 Sistanizadeh et al. ....... 370/352
6,768,743 B1 * 7/2004 Borella et al. ............. 370/401
2006/0004733 A1 * 1/2006 Zoltan et al. ................ 707/3

* cited by examiner

*Primary Examiner*—Wen-Tai Lin
(74) *Attorney, Agent, or Firm*—Marger Johnson & McCollom P.C.

(57) ABSTRACT

A method of dynamically obtaining a network address for a client includes transmitting a request for a network address. A plurality of network address offers can be received from a plurality of servers in response to the request. One of the plurality of offers can then be selected by the client using information contained in one or more of the offers. In one embodiment, a network comprises a client configured to dynamically obtain a network address from one of a plurality of servers. The client sends a discover message including a client identifier to the network. The servers receive the discover message and respond with offers including proposed network addresses. One or more of the offers further include a server identifier. The client preferably only accepts an offer containing an appropriate server identifier.

17 Claims, 4 Drawing Sheets

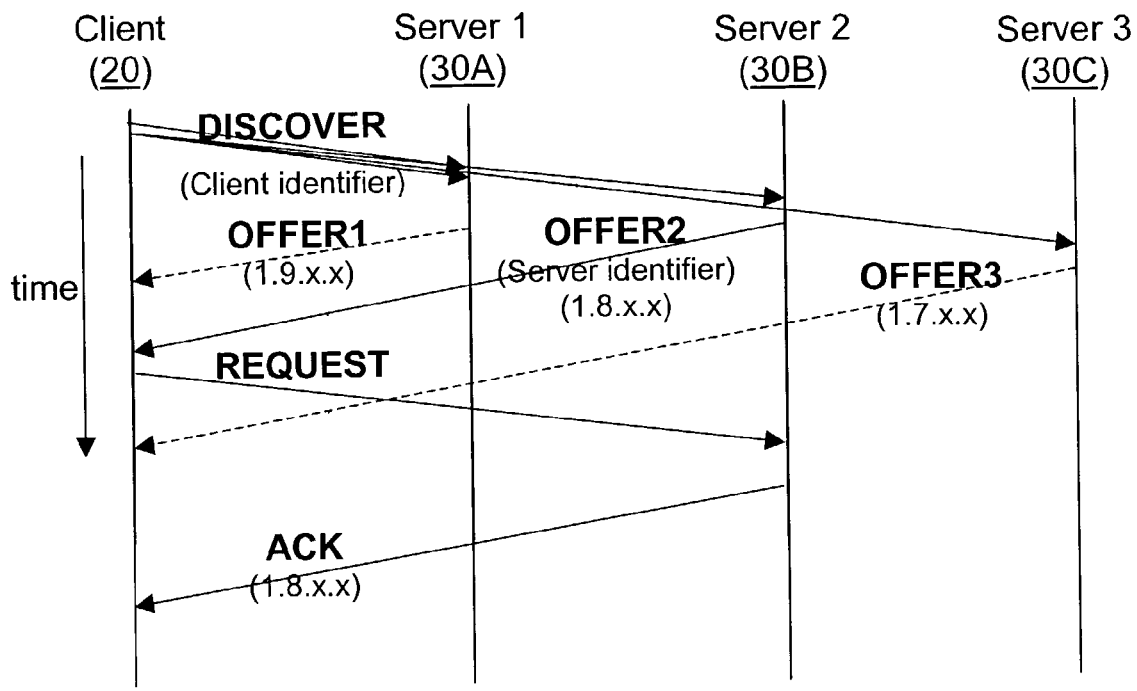
FIG. 4
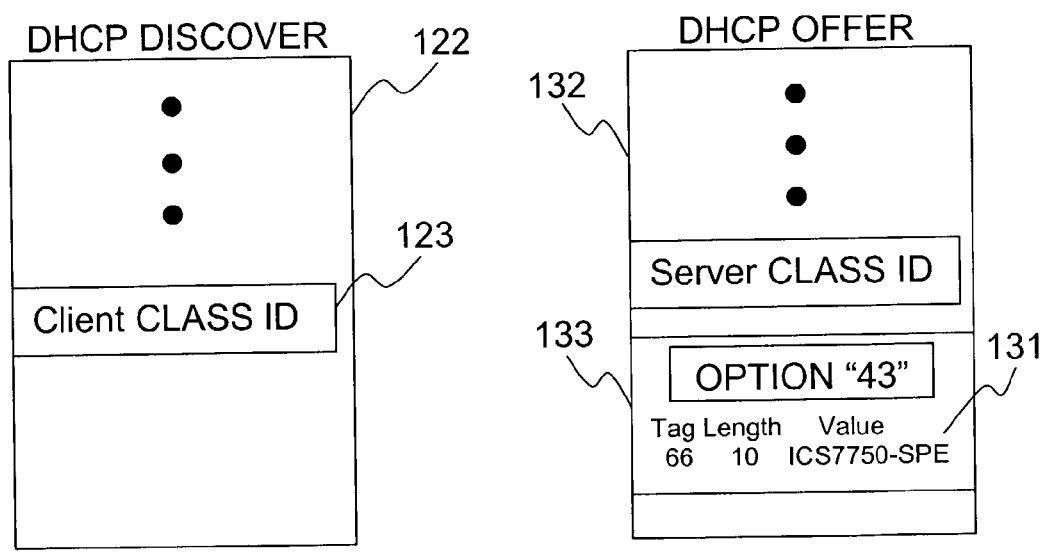
FIG. 5A  FIG. 5B

SELECTING NETWORK ADDRESS OFFERED BY A PLURALITY OF SERVERS BASED ON SERVER IDENTIFICATION INFORMATION

BACKGROUND OF THE INVENTION

1. Field of the Invention

The present invention relates to methods for dynamically assigning network addresses. More specifically, this invention relates to a method for selectively assigning a network address to a client. In particular, this invention relates to a method for a client to selectively accept a network address from one of multiple servers in a single or multiple subnets.

2. Related Art

A Dynamic Host Confirmation Protocol (DHCP) can be used to dynamically assign network addresses, such as Internet Protocol (IP) addresses, in a computer network. FIG. 1 is a schematic block diagram of a typical network 10 having a client 20, such as a router, that dynamically requests an IP address from a DHCP server 30. Referring to FIG. 1, when the client 20 desires to connect to the network 10, it first establishes a network address. If it does not have an address permanently assigned, it must obtain one dynamically. To do this the client 20 sends out a DHCP request for a network address through its network input/output (I/O) port 21. The DHCP server 30 receives this request into its network I/O port 31 and responds by offering a network address from its pool of IP addresses 35 through its I/O port 31. The client 20 receives this offer into its I/O port 21 and accepts it by sending back a direct request for the proposed IP address. The server 30 then assigns the IP address to the client 20 and sends an acknowledgement back to the client. The client's network address is thereby established.

FIG. 2 is a schematic block diagram of a typical network 10A having a plurality of subnets 15A, 15B, 15C. In this figure, each subnet 15A, 15B, 15C includes a DHCP server 30A, 30B, 30C, respectively. It should be noted, however, that the multiple DHCP servers can be located in a single subnet. FIG. 3 is a schematic signal diagram illustrating signals sent between the client 20 and the plurality of DHCP servers 30A, 30B, 30C during a conventional DHCP transaction in the network 10A of FIG. 2.

In a conventional DHCP transaction in a network having multiple DHCP servers, a client broadcasts a DHCP request to obtain an IP address and other configuration parameters. More particularly, referring to FIGS. 2 and 3, a client 20 seeking a network address broadcasts a DHCP discover message DISCOVER over the network 10A. Routers 40 can relay signals between multiple subnets 15A, 15B, 15C, where present. Each network DHCP server 30A, 30B, 30C that receives the discover message sends back an offer OFFER1, OFFER2, OFFER3 to the client 20 with a proposed IP address (e.g., 1.9.x.x, 1.8.x.x, or 1.7.x.x, respectively). The proposed IP address can, for instance, correspond to a particular subnet.

The client 20 responds to the first offer it receives back by sending a request for the proposed address REQUEST to the server 30A that made the offer. In the example shown in FIG. 3, for example, the client 20 first receives, and therefore accepts, an offer OFFER1 from the first server 30A. The first server 30A then assigns the proposed IP address (1.9.x.x) to the client through an acknowledge ACK signal.

In the conventional DHCP transaction, therefore, the client accepts the first IP address offered to it, without distinguishing between the various offers it receives. Because the client does not distinguish between the DHCP offers it receives back from the DHCP servers on the network, it cannot give preference to a DHCP server having certain characteristics over the other DHCP servers. There is conventionally, therefore, no process for distinguishing between DHCP offers or selecting an optimal IP address for that particular client. Accordingly, it would be desirable to have a method of dynamically assigning IP addresses wherein a client dynamically selects an IP address from multiple offers received from multiple DHCP servers.

SUMMARY OF THE INVENTION

One object of the present invention is to enable a client to selectively accept a network address offer from among a plurality of offers based on selection criteria.

Another object of the present invention is to provide a network client with the ability to identify a server or server class before accepting a network address offer therefrom.

A network preferably comprises a client and a server. In a preferred embodiment, the client is configured to dynamically obtain a network address. To do this, the client sends out a discover message to the network. The discover message preferably includes a client identifier that identifies the client type. The server receives the discover message and responds with an offer that is dependent on the client type. When the server responds, the offer preferably includes a proposed network address as well as a server identifier. When the client receives an offer containing an appropriate server identifier from a server, it sends a request to the appropriately identified server asking to be assigned that proposed network address. The server then assigns that proposed network address to the client and transmits an acknowledge signal to the client.

According to another aspect of the present invention, a method of dynamically obtaining a network address for a client includes transmitting a request for a network address. A plurality of network address offers are received from a plurality of servers in response to the network address request. One of the plurality of offers is selected based on selection criteria, such as server information, contained in that offer.

For example, the request can have client identification information embedded therein, where only a certain server or class of servers is/are configured to recognize the client identification information contained in the request. That server or class of servers can then be configured to respond with an offer signal that includes server identification information. The client is preferably configured to only accept an offer from a server whose offer contains appropriate server identification information. Most preferably, the request is a DHCP request and the offers are DHCP offers.

A network device (e.g., a client) according to another embodiment of this invention can include an output port configured to transmit a request for a network address. The request preferably has a network device identifier that identifies the type of network device making the request. An input port is then configured to receive a plurality of network address offers from a plurality of servers. At least one of the offers should include a server identifier. A processing unit in the network device can then be configured to evaluate the offers and accept an offer that has an appropriate server identifier.

BRIEF DESCRIPTION OF THE DRAWINGS

The foregoing objects, features, and advantages of the present invention will become more readily apparent from the following detailed description of preferred embodiments, made with reference to the following figures, in which:

FIG. 4 is a schematic signal diagram illustrating signals between the DHCP client and DHCP servers in the network of FIG. 2 according to one embodiment of the present invention.

FIG. 5A is a schematic block diagram of a discover signal packet configured according to an embodiment of the present invention.

FIG. 5B is a schematic block diagram of an offer signal packet configured according to an embodiment of the present invention.

DETAILED DESCRIPTION OF PREFERRED EMBODIMENTS

Various preferred embodiments of the present invention will now be described with reference to the accompanying figures.

Figure 1:
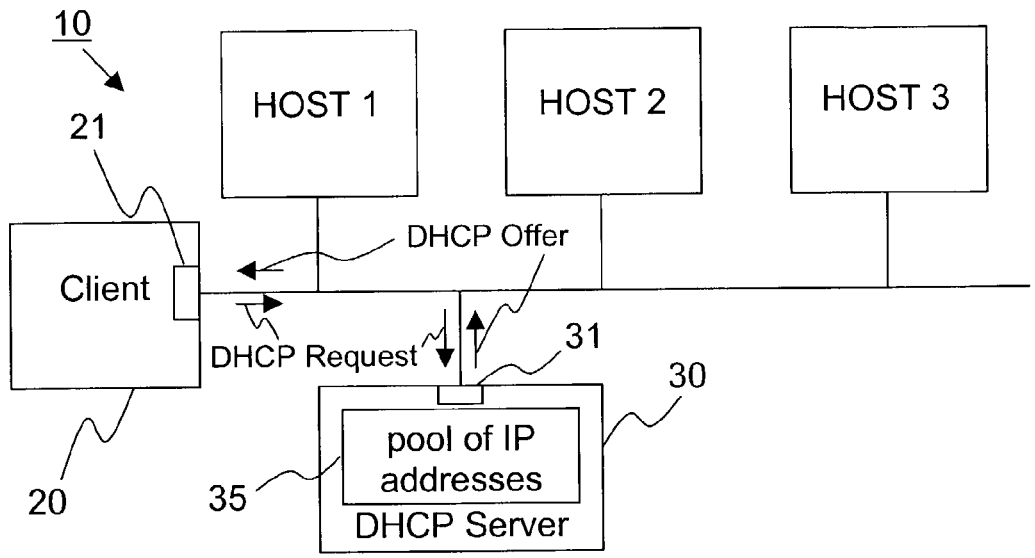
FIG. 1 is a schematic block diagram illustrating a conventional network including a DHCP client and a DHCP server.
Figure 3:
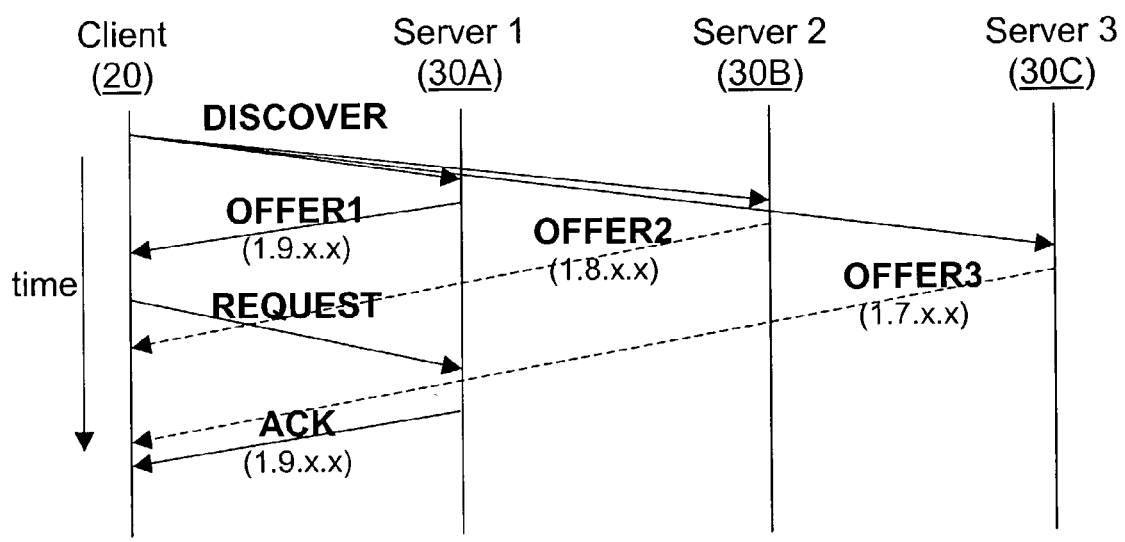
FIG. 3 is a schematic signal diagram illustrating a conventional method of requesting and accepting DHCP offers in the network of FIG. 2.
Figure 2:
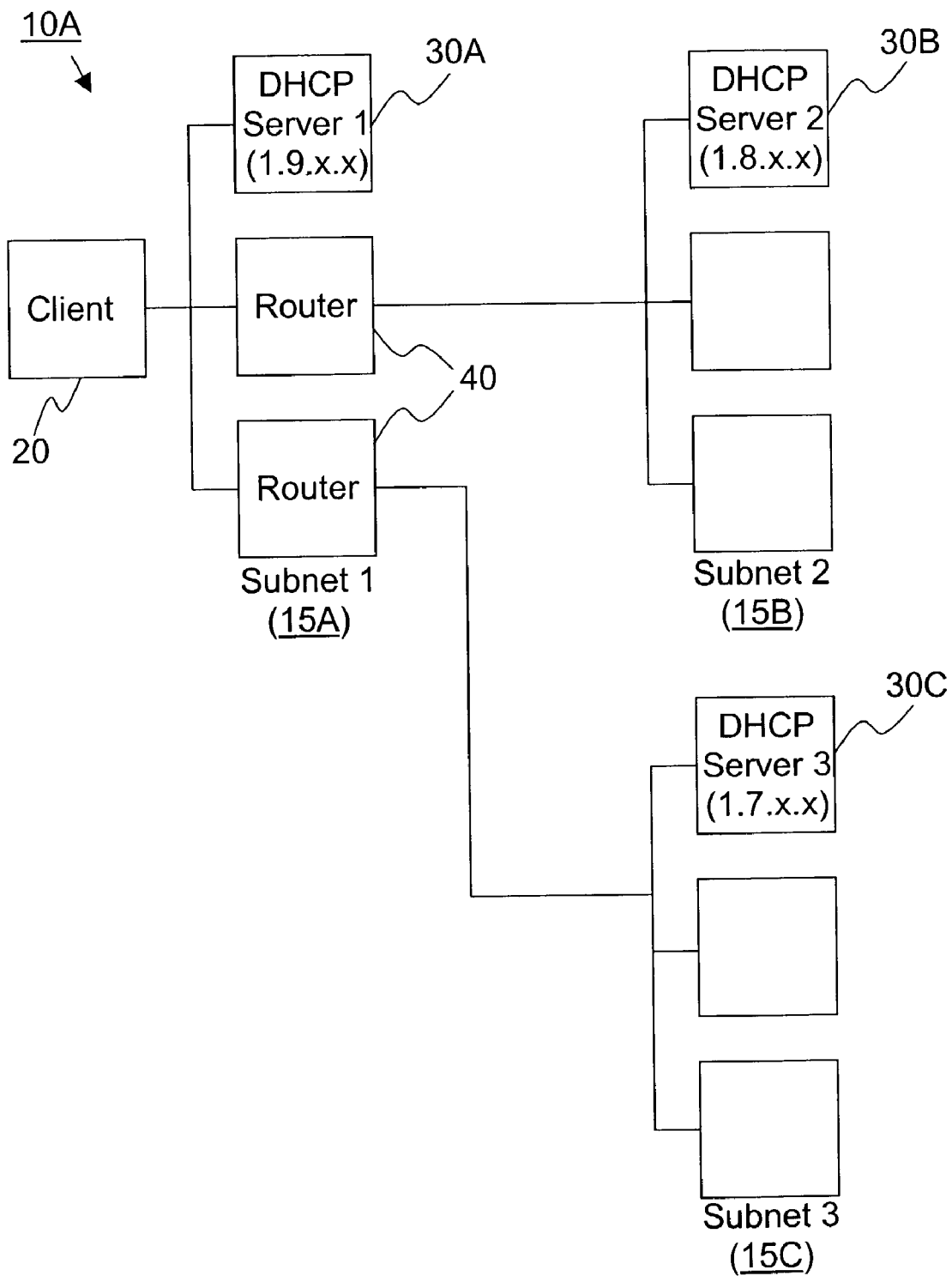
FIG. 2 is a schematic block diagram illustrating a conventional network including a client and a plurality of DHCP servers.

FIG. 4 is a schematic timing diagram illustrating signals transmitted between the client and the plurality of servers of FIG. 2 during a Dynamic Host Confirmation Protocol (DHCP) transaction according to one embodiment of the present invention. Although the following embodiments are described primarily in terms of DHCP transactions, it should be noted that this method can be adapted to apply to other methods or protocols for assigning network addresses as well. It should also be noted that although the servers in FIG. 2 are shown in separate subnets, the principles of the present invention apply equally when multiple servers are arranged in a single subnet.

Referring to FIGS. 2 and 4, a client 20 according to this embodiment sends out a request for an IP address DISCOVER that includes a client identifier. The second server 30B is configured to recognize the client identifier in the discover request DISCOVER. Depending on the application, other servers may also be configured to recognize the client identifier. When the second server 30B receives a discover request DISCOVER containing an appropriate client identifier, it responds with an IP address offer OFFER2 containing a server identifier. The client 20 is configured to only accept an offer containing the appropriate server identifier. Accordingly, in this example, the client 20 accepts the offer OFFER2 from the second server 30B located in the second subnet 15B.

Although the other servers 30A, 30C may also respond to the discover message, if they are not configured to recognize the client identifier, they will not respond with an appropriate server identifier. Accordingly, the client 20 ignores the offers OFFER1, OFFER3 from the other two DHCP servers 30A, 30C on the network 10A. In an alternative embodiment, however, one or more of the server(s) can be configured to send a server identifier regardless of whether or not the client sends an identifier. The client could then select an offer from a server sending an appropriate server identifier without having sent a client identifier.

FIGS. 5A and 5B illustrate one method of encoding client and server information in a network address request signal DHCP DISCOVER and a network address offer signal DHCP OFFER, according to an embodiment of the present invention. FIG. 5A shows schematically a DHCP discover signal packet 122 that includes a client identifier (descriptor) CLASS ID, in addition to the conventional DHCP discover message contents. FIG. 5B schematically illustrates a DHCP offer packet 132 from an appropriately configured server, which includes a server identifier 131 in the "vendor specific information" block 133 of the offer signal packet 132. Although these figures relate particularly to DHCP discover and offer signals, the principles are equally applicable to other network address request and offer signals.

Referring to FIGS. 5A and 5B, in this embodiment, a DHCP client attempting to obtain a network address broadcasts its client identifier CLASS ID in the "vendor class identifier" field 123 of its DHCP Discover message 122. The DHCP client's acceptance criteria for DHCP offers is based on data presented in the "vendor specific information" (Option "43") field 133 of the DHCP offers 132 it receives. More specifically, a string of data providing a predefined server class identifier 131 as its value can be included within Option "43", Tag (sub-option) "66" (Trivial File Transfer Protocol (TFTP) server name) of the vendor specific information field 133. In one embodiment, only if this sub-option tag "66" and the predefined class identifier 131 is returned within Option "43" of the DHCP offer 132, is the offer accepted by the client. All other offers are ignored and thereby rejected. Hence, the DHCP client will accept an offer only from a DHCP server providing a predetermined class identifier, and thereby filters out offers from servers that do not fall within this subset.

In summary, although most of the DHCP offer packet 132 is strictly defined, the "vendor specific information" part 133 of the packet provides the ability in Option "43" to encode additional information, such as server identity 131, into the packet. Accordingly, when the client that sent the encoded DHCP discover signal 122 receives back an offer containing the appropriate server identifier, it accepts that offer and establishes an IP address. This method thereby allows DHCP clients to accept offers only from DHCP servers that meet predetermined requirements.

This mechanism can be extended by defining various tags within Option 43. The responding servers can be configured, for instance, to fill values for these tags in the DHCP offers they send. The client can then be configured to use an algorithm to decide the best DHCP offer based on the various tag values in Option 43 of the DHCP offers received. The ability to use this selection criteria provides DHCP clients with intelligence in deciding which DHCP offers to accept and reject, rather than simply unconditionally accepting the first offer.

Figure 6:
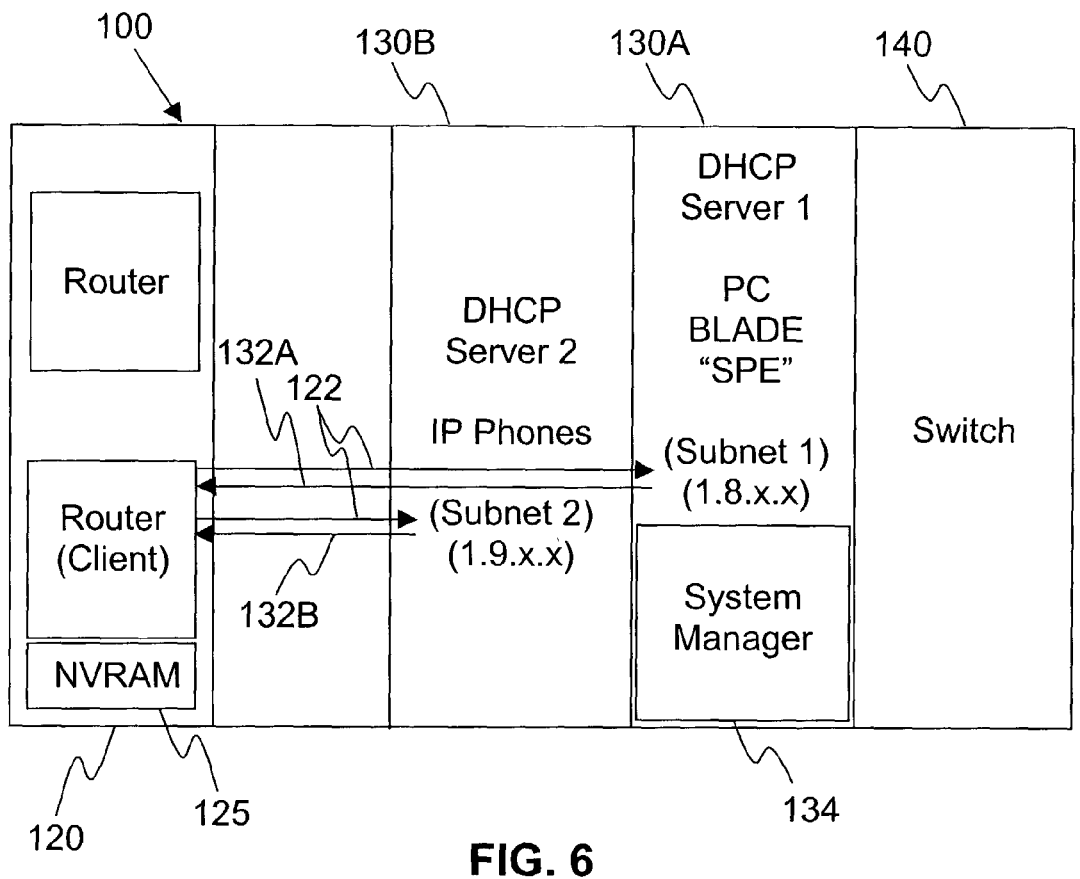
FIG. 6 is a schematic block diagram of a networking apparatus chassis comprising a router blade, an IP phone server, a windows PC blade server, and a switch, according to another embodiment of the present invention.

FIG. 6 illustrates a network apparatus configured to perform the method described previously with respect to FIGS. 5A and 5B according to another embodiment of the present invention. In particular, referring to FIGS. 5A, 5B, and 6, this network apparatus comprises a chassis 100 including a router blade 120 (e.g., a model MRP300 router blade available from Cisco Systems, Inc.) and a first DHCP server 130A. The first DHCP server 130A preferably comprises a single board computer 130A running a computer operating system. The single board computer is also referred to as a System Processor Engine (SPE) or a PC blade. The chassis 100 may also include other DHCP servers, such as a second DHCP server 130B for IP phones. The chassis 100 can be further connected to additional networks and therefore additional DHCP servers through the switch 150.

In this embodiment, the router blade 120, which runs an Internetworking Operating System (IOS), needs to get its IP address and startup configuration from the first DHCP server (SPE) 130A in the same chassis, and not from any other DHCP server. This is because, in order for the system to operate correctly, the router blade 120 should be discovered and accessed by the SM software 134 running on the SPE 130A. System Manager (SM) software 134 running on the SPE 130A can discover and access the router blade 120 only if the router blade 120 has a configuration (including telnet passwords) delivered by the SM software 134. Therefore the router blade 120 should accept an IP address and configuration file only from the SPE 130A in the same chassis.

Accordingly, the router blade 120 broadcasts a DHCP request 122 containing a pattern in the "vendor class identifier" field 123 of DHCP Request 122 that identifies the router blade 120. More specifically, the "vendor class identifier" field 123 in DHCP Request messages 122 sent during a DHCP transaction contains an identification character string (e.g., "ICS7750-MRP300" for the MRP300). The SPE 130A receives the request and identifies it as having been sent by the router blade 120. The SM software 134 on the SPE 130A then sends a DHCP Response message 132A including the proposed IP address, TFTP server identification, and a configuration file name.

Specifically, the DHCP offer 132A sent to the router blade 120 from the SPE 130A includes the server's vendor class identifier 131 as the value for Option "66" inside Option "43" of the vendor specific information field 133. The router blade 120 looks for a specific character pattern (e.g., "ICS7750-SPE" for a model ICS7750 chassis) in sub-option "66" of Option "43" of the vendor specific information block 133 in the DHCP Response 132A, to make sure that it gets its IP address and initial configuration from the SM software 134, and not from any other DHCP server.

If the DHCP Response 132A contains the expected pattern in sub-option "66" of Option "43" and a configuration file name, then the router blade 120 accepts the IP address and then downloads the configuration file from the identified TFTP server and merges it with a running configuration file. The router blade 120 is thereby configured with the SM software delivered passwords and the IP address. The router blade 120 then preferably sends Cisco Discovery Protocol (CDP) packets and the SM software 134 discovers the router blade 120 from the CDP table on the System Switch Processor (SSP).

If the SM software 134 does not respond to the router blade's DHCP requests, then, after a certain time (e.g., approximately 17 seconds), the router blade 120 enters a standard initial setup dialog. DHCP requests continue to be sent in the background, however, until the setup dialog is quit or aborted, or a network interface (e.g., a FastEthernet interface) is configured with an IP address.

In summary, if the router blade 120 does not have an IP address for its IP interface, it sends DHCP requests and configures its IP interface with an IP address obtained from the SM software 134 on the SPE 130A. This configuration is then preferably saved locally in the router blade's non-volatile Random Access Memory (NVRAM) 125. For subsequent boots, therefore, the router blade 120 can pick up the IP address from its NVRAM 125 and does not need to get it from the SM software 134. When a router blade is moved from one chassis to another, its startup configuration data should be erased so that the router blade will obtain a new IP address from the SM software in the new chassis. Failure to reset the startup configuration data can result in the router blade not being discovered by the new SM software.

A new router blade should not have any configuration data stored in its NVRAM. Accordingly, on the first boot of a MRP300 router blade in a ICS7750 chassis, for example, the MRP300 will send DHCP requests as explained above and download the configuration from the SM software in the ICS7750. The SM software (icsConfig) will manage (or modify) the "sacred" IOS system commands. Configurations are saved locally in the MRP300's NVRAM and not remotely in the SPE. When the MRP300's configuration is changed (e.g., through an icsConfig command), the SM software telnets to the MRP300 and issues a copy running-config startup-config command, which saves the configuration in the MRP300's NVRAM. Once the NVRAM is populated, on subsequent reboots, the configuration from the NVRAM will be read to configure the router.

If multiple chassis having the same server class IDs are connected in a network, the foregoing method can be further modified to ensure that the router blade only gets its network address and setup information from a SPE in the same chassis. This can be accomplished for instance, by configuring the SPEs in the various chassis to reply to a request for a network address only if the request came from within the same chassis, in addition to containing the appropriate client identifier in its CLASS ID. An SPE can be configured to determine whether or not the request came from within the same chassis by determining which port the request came through. If the request comes through an external port, the SPE is preferably configured not to respond to the request.

Figure 7:
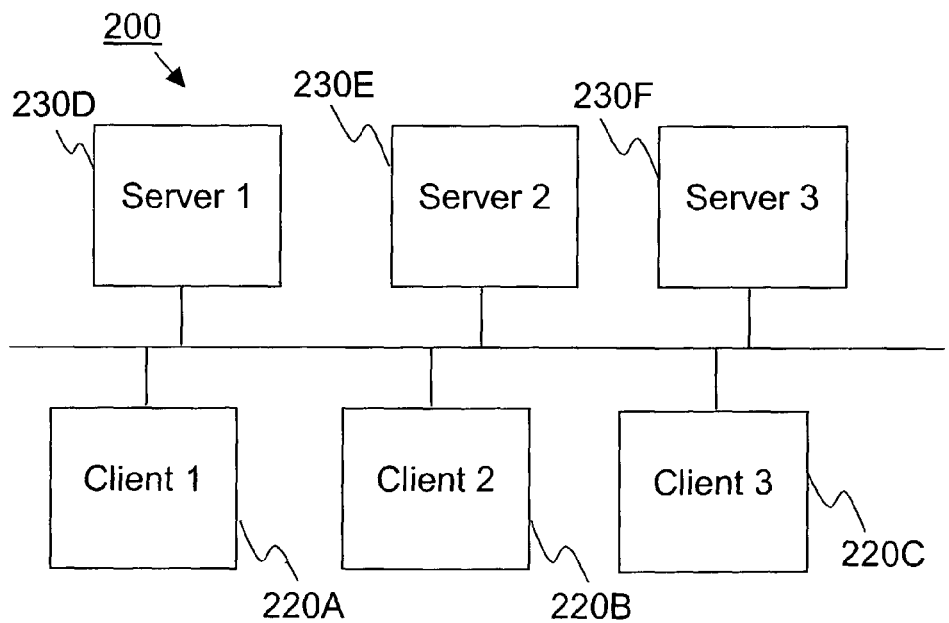
FIG. 7 is a schematic block diagram of a computer network illustrating a method of assigning a network address according to another embodiment of the present invention.

FIG. 7 is a schematic block diagram of a network 200 having a plurality of servers 230 and a plurality of clients 220 arranged to illustrate another aspect of the present invention. Referring to FIG. 7, a network 200 includes a plurality of clients 220A, 220B, 220C configured to request a network address. A plurality of servers 230D, 230E, 230F are configured to receive the network address requests from the clients 220A, 220B, 220C. According to this aspect of the invention, the servers 230D, 230E, 230F can be configured to selectively respond to any one or more (or none) of the clients 220A, 220B, 220C. Similarly, the clients 220A, 220B, 220C can be configured to selectively accept a network address offer from any one or more of the servers 230D, 230E, 230F based on selection criteria.

For example, a first server 230D can be configured to send offers to both a first client 220A and a second client 220B, but not a third client 220C. A second server 230E can be configured to respond to an address request from the third client 220C, but not the first or second client 220A, 220B. And a third server 230F can be configured to respond to the second or third client 220B, 220C, but not the first client 220A. Accordingly, in this example, when the first client 220A broadcasts a discover request to the network 200, the request is received by each of the servers 230D, 230E, 230F but only the first server 230D sends a network address offer. If the second client 220B sends a discover message, however, both the first and third servers 230D, 230F will send a response with a network address offer. Similarly, if the third client 220C sends a discover message, both the second and third servers 230E, 230F will send a response. The servers can distinguish between clients, for example, by a client identifier in the discover message.

In another example, the first client 220A can be configured to accept a network address offer only from the first or second servers 230D, 230E and not to accept a network address offer from the third server 230F. Similarly, the second client can be configured to only accept an offer from the second server 230E and the third client can be configured to only accept an offer from the third server 230F. The clients can be configured to distinguish between the servers, for example, using a server identifier in the offer signal.

Of course, according to the principles described above, the servers could be configured to respond to any one or more, all, or none of the clients. Similarly, the clients could be configured to respond to any one, all, or any subcombination of the servers. Furthermore, any combination of server and client recognition and selection is also possible according to the principles described above.

Having described and illustrated the principles of the invention in various preferred embodiments thereof, it should be apparent that the invention can be modified in arrangement and detail without departing from such principles. The following claims should therefore be interpreted to cover all such modifications and variations coming within the spirit and scope of the above-described invention.

What is claimed is:

1. A method of obtaining a network address for a client, comprising:
    transmitting a request for a network address, where the request contains client identification information;
    configuring only a certain server or class of servers to recognize the client identification information in the request and to respond with a corresponding offer signal including server identification information responsive to the client identification information;
    receiving a plurality of network address offers from a plurality of servers including the certain server and the class of servers, where at least one of the offers is the offer signal including the server identification information; and
    selectively accepting the offer signal including the server identification information, wherein the client identification information is a client class identifier provided in a vendor class identifier field in the request and wherein the server identification information is a server class identifier provided in a vendor specific information field of the offer.

2. A method according to claim 1, wherein the request is a Dynamic Host Confirmation Protocol (DHCP) request and wherein the offers are DHCP offers.

3. A method according to claim 2, wherein server identification information is included in a vendor specific information field of the DHCP offer.

4. A method according to claim 3, wherein the server identification information is included in tag "66" within option field "43" of the vendor specific information field of the DHCP offer.

5. A method according to claim 2, further comprising including the information used in selecting the offer in one or more tags in the DHCP offer.

6. A method according to claim 2, wherein selectively accepting one of the plurality of DHCP offers comprises accepting an offer from a server providing predetermined server identification information in its DHCP offer.

7. A network device comprising:
    an output port configured to transmit a request for a network address, the request comprising a network device identifier that identifies a type of network device making the request;
    an input port configured to receive a plurality of offers to establish a network address from a plurality of servers, wherein at least one of the offers includes a server identifier identifying a type of server configured to recognize the client identifier in the request and encode the server identifier in the at least one offer; and
    a processing unit configured to accept the at least one offer based on the server identifier.

8. A device according to claim 7, wherein the device is a client, and wherein the request comprises a Dynamic Host Confirmation Protocol (DHCP) discover request having a client identifier.

9. A device according to claim 8, wherein the client identifier is provided in a vendor class identifier field in the DHCP discover request.

10. A device according to claim 8, wherein one or more server identifiers are provided in a vendor specific information field of a corresponding DHCP offer.

11. A device according to claim 8, wherein the request for a network address comprises a Dynamic Host Confirmation Protocol (DHCP) discover request having a client identifier embedded therein, and wherein the offer comprises a DHCP offer having a server identifier embedded therein.

12. A method of selectively accepting a network address offer, said method comprising:
    transmitting a network address request signal from a client, where the request contains client identification information identifying a type of client;
    configuring a certain server or class of servers to recognize the client identification information in the request and to respond with an offer including server identification information identifying a type of client;
    responding to the network address request signal with a plurality of offers from a plurality of servers, wherein at least one of the offers is the offer including the server identification information;
    distinguishing among the plurality of offers in the client according to the server identification information; and
    selectively accepting the at least one offer based on the server identification information contained in the offer to establish a network address for the client.

13. A method according to claim 12, wherein the network address request signal comprises a Dynamic Host Confirmation Protocol (DHCP) discover request having a DHCP client identifier.

14. A method according to claim 13, further comprising configuring one or more of the servers to recognize the DHCP client identifier in the discover request.

15. A method according to claim 12, wherein selectively accepting one of the offers comprises accepting a DHCP offer containing an appropriate server identifier.

16. An electronic medium containing code for obtaining a network address for a client, said code, when executed, causing a computer to:
    transmit a request for a network address from a client, wherein the request includes client identification information;
    configure a certain server or class of servers to recognize the client identification information in the request and to respond with an offer including server identification information;

receive a plurality of network address offers from a plurality of servers into the client, wherein at least one of the offers is the offer including the server identification information; and selectively accepting the offer including the server identification information, wherein the client identification information is a client class identifier provided in a vendor class identifier field in the request and wherein the server identification information is a server class identifier provided in a vendor specific information field of the offer.

17. A device for obtaining a network address for a client, comprising:

means for transmitting a request for a network address, where the request includes client identification information;

means for configuring a certain server or class of servers to recognize the client identification information in the request and to respond to the request with an offer including server identification information;

means for receiving a plurality of network address offers from a plurality of servers, wherein at least one of the offers is the offer including server identification information; and means for selectively accepting the at least one offer including the server identification information.

* * * * *